US012691947B2

(12) United States Patent
Park et al.

(10) Patent No.: US 12,691,947 B2
(45) Date of Patent: Jul. 28, 2026

(54) VEHICLE DASH CROSSMEMBER AND VEHICLE BODY

(71) Applicants: Hyundai Motor Company, Seoul (KR); Kia Corporation, Seoul (KR)

(72) Inventors: Ji Woong Park, Hwaseong-si (KR); Kyeong Jae Kim, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 236 days.

(21) Appl. No.: 18/462,622

(22) Filed: Sep. 7, 2023

(65) Prior Publication Data

US 2024/0278852 A1 Aug. 22, 2024

(30) Foreign Application Priority Data

Feb. 22, 2023 (KR) ........................ 10-2023-0023731

(51) Int. Cl.
B62D 25/14 (2006.01)

(52) U.S. Cl.
CPC .................................. B62D 25/145 (2013.01)

(58) Field of Classification Search
CPC ...................................................... B62D 25/145
See application file for complete search history.

(56) References Cited

U.S. PATENT DOCUMENTS

| | | | | |
|---|---|---|---|---|
| 4,285,540 A | * | 8/1981 | Harada | B60H 1/28 |
| | | | | 15/250.19 |
| 4,789,198 A | * | 12/1988 | Ide | B62D 25/081 |
| | | | | 296/192 |
| 4,909,565 A | * | 3/1990 | Harasaki | B62D 25/082 |
| | | | | 296/198 |
| 5,707,100 A | | 1/1998 | Suyama et al. | |
| 6,170,906 B1 | * | 1/2001 | Kasuga | B62D 25/082 |
| | | | | 296/203.02 |
| 6,447,052 B2 | | 9/2002 | Saeki | |
| 8,702,158 B2 | | 4/2014 | Kihara et al. | |
| 9,751,570 B2 | * | 9/2017 | Kim | B62D 21/03 |
| 9,988,100 B2 | * | 6/2018 | Kim | B62D 25/082 |
| 10,538,273 B2 | | 1/2020 | Shirakami et al. | |
| 10,549,787 B2 | | 2/2020 | Kita et al. | |
| 10,597,081 B2 | * | 3/2020 | Ayukawa | B62D 25/2018 |
| 10,647,358 B2 | * | 5/2020 | Dressel | B62D 21/11 |
| 10,843,733 B2 | | 11/2020 | Yoshida et al. | |
| 10,919,472 B2 | * | 2/2021 | Chung | B60R 19/34 |
| 12,337,899 B2 | * | 6/2025 | Park | B62D 25/14 |
| 2001/0020797 A1 | | 9/2001 | Saeki | |
| 2011/0193369 A1 | | 8/2011 | Wuest et al. | |

(Continued)

FOREIGN PATENT DOCUMENTS

| | | |
|---|---|---|
| CN | 102905960 A | 1/2013 |
| CN | 212605454 U | 2/2021 |

(Continued)

*Primary Examiner* — Jonathan Malikasim
(74) *Attorney, Agent, or Firm* — Slater Matsil, LLP

(57) ABSTRACT

An embodiment vehicle dash crossmember includes a cross portion extending in a width direction of a vehicle body and a front portion protruding from the cross portion toward a front of the vehicle body, wherein the front portion includes a plurality of through holes. An embodiment vehicle body may include a floor panel, the dash crossmember mounted on a front edge of the floor panel, and a dash panel connected to a top edge of the dash crossmember.

20 Claims, 11 Drawing Sheets

(56)                   References Cited

U.S. PATENT DOCUMENTS

| | | | |
|---|---|---|---|
| 2013/0069393 A1 | 3/2013 | Kihara et al. | |
| 2015/0166104 A1 | 6/2015 | Ohhama et al. | |
| 2016/0221609 A1 | 8/2016 | Furusaki | |
| 2016/0368535 A1* | 12/2016 | Kim | B62D 25/08 |
| 2017/0043810 A1* | 2/2017 | Kim | B62D 27/023 |
| 2017/0166258 A1* | 6/2017 | Kim | B62D 25/082 |
| 2019/0009829 A1 | 1/2019 | Shirakami et al. | |
| 2019/0225272 A1 | 7/2019 | Yoshida et al. | |
| 2023/0286593 A1 | 9/2023 | Kawano | |
| 2024/0278853 A1* | 8/2024 | Park | B62D 25/145 |
| 2025/0187673 A1* | 6/2025 | Park | B62D 25/08 |
| 2025/0187675 A1* | 6/2025 | Park | B62D 25/142 |

FOREIGN PATENT DOCUMENTS

| | | |
|---|---|---|
| CN | 110077469 B | 7/2021 |
| EP | 1073579 B1 | 6/2002 |
| JP | 2564688 B2 | 12/1996 |
| JP | H11208508 A | 8/1999 |
| JP | 2000177638 A | 6/2000 |
| JP | 3446712 B2 | 9/2003 |
| JP | 2007069640 A | 3/2007 |
| KR | 20130101890 A | 9/2013 |
| KR | 102072663 B1 | 2/2020 |

* cited by examiner

VEHICLE DASH CROSSMEMBER AND VEHICLE BODY

CROSS-REFERENCE TO RELATED APPLICATIONS

This application claims the benefit of Korean Patent Application No. 10-2023-0023731, filed on Feb. 22, 2023, which application is hereby incorporated herein by reference.

TECHNICAL FIELD

The present disclosure relates to a vehicle body including a dash crossmember.

BACKGROUND

A vehicle includes a dash panel and a dash crossmember by which a passenger compartment and a front compartment are divided. A powertrain system including a prime mover may be disposed in the front compartment. For example, a mechanical powertrain system including an internal combustion engine and a transmission in an internal combustion engine vehicle may be disposed in the front compartment, and an electric powertrain system including an electric motor, an inverter, and a transmission in an electric vehicle may be disposed in the front compartment. The dash crossmember may be mounted on a front edge of a floor panel, and the dash panel may be connected to a top edge of the dash crossmember. The dash crossmember may extend in a width direction of the vehicle and have a closed cross-section to improve stiffness thereof.

The combination or integration of vehicle body parts/components may be continuously required due to the increased complexity of vehicles. Casting methods such as high-vacuum die casting may be advantageous for the combination or integration of parts/components, and demand for them is increasing. For example, a dash crossmember according to the related art may have a closed cross-section through pressing, joining, and the like, thereby meeting its desired target stiffness. However, the plurality of parts/components may be manufactured by pressing and be joined using fasteners, welding, and the like, so a manufacturing process of the dash crossmember may become very complex, and the manufacturing cost thereof may relatively increase.

The above information described in this background section is provided to assist in understanding the background of the inventive concept and may include any technical concept which is not considered as the prior art that is already known to those skilled in the art.

SUMMARY

The present disclosure relates to a vehicle body including a dash crossmember. Particular embodiments relate to a vehicle dash crossmember having an open cross-section and a plurality of reinforcing ribs.

Embodiments of the present disclosure can solve problems occurring in the prior art while advantages achieved by the prior art are maintained intact.

An embodiment of the present disclosure provides a vehicle dash crossmember manufactured by a casting method such as high-vacuum die casting and designed to have an open cross-section and a plurality of ribs, thereby relatively reducing the manufacturing cost thereof.

According to an embodiment of the present disclosure, a vehicle dash crossmember may include a cross portion extending in a width direction of a vehicle body and a front portion protruding from the cross portion toward the front of the vehicle body. The front portion may have a plurality of through holes.

The front portion may include a vertical wall spaced apart from the cross portion toward the front of the vehicle body and a horizontal wall connecting the vertical wall and the cross portion. The plurality of through holes may be provided in the horizontal wall.

The cross portion may include a vertical wall extending in the width direction of the vehicle body. The front portion may further include a plurality of reinforcing ribs provided between the vertical wall of the front portion and the vertical wall of the cross portion.

The vehicle dash crossmember may further include a pair of outrigger portions provided at both ends of the cross portion.

A gap between front ends of the pair of outrigger portions may be less than a gap between rear ends of the pair of outrigger portions.

The vehicle dash crossmember may further include a pair of enlarged portions provided at both ends of the front portion. A width of each enlarged portion may gradually increase from each end of the front portion toward an inboard portion of a corresponding outrigger portion.

Each enlarged portion may include a side extension wall extending obliquely from each end of the front portion toward the corresponding outrigger portion and a horizontal wall connecting the side extension wall and the vertical wall of the cross portion.

Each enlarged portion may have a plurality of through holes provided in the horizontal wall.

Each enlarged portion may further include a plurality of reinforcing ribs provided between the side extension wall and the vertical wall of the cross portion.

The cross portion may include a plurality of mounting bosses integrally formed on a bottom surface thereof.

According to another embodiment of the present disclosure, a vehicle body may include a floor panel, a dash crossmember mounted on a front edge of the floor panel, and a dash panel connected to a top edge of the dash crossmember.

The dash crossmember may include a cross portion extending in a width direction of the vehicle body and a front portion protruding from the cross portion toward the front of the vehicle body. The front portion may have a plurality of through holes.

The front portion may include a vertical wall spaced apart from the cross portion toward the front of the vehicle body and a horizontal wall connecting the vertical wall and the cross portion. The plurality of through holes may be provided in the horizontal wall.

The cross portion may include a vertical wall extending in the width direction of the vehicle body. The front portion may further include a plurality of reinforcing ribs provided between the vertical wall of the front portion and the vertical wall of the cross portion.

The dash panel may include a panel portion and a windshield matching portion integrally formed on a top edge of the panel portion. The windshield matching portion may have a matching surface inclined at a predetermined angle.

BRIEF DESCRIPTION OF THE DRAWINGS

The above and other objects, features, and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
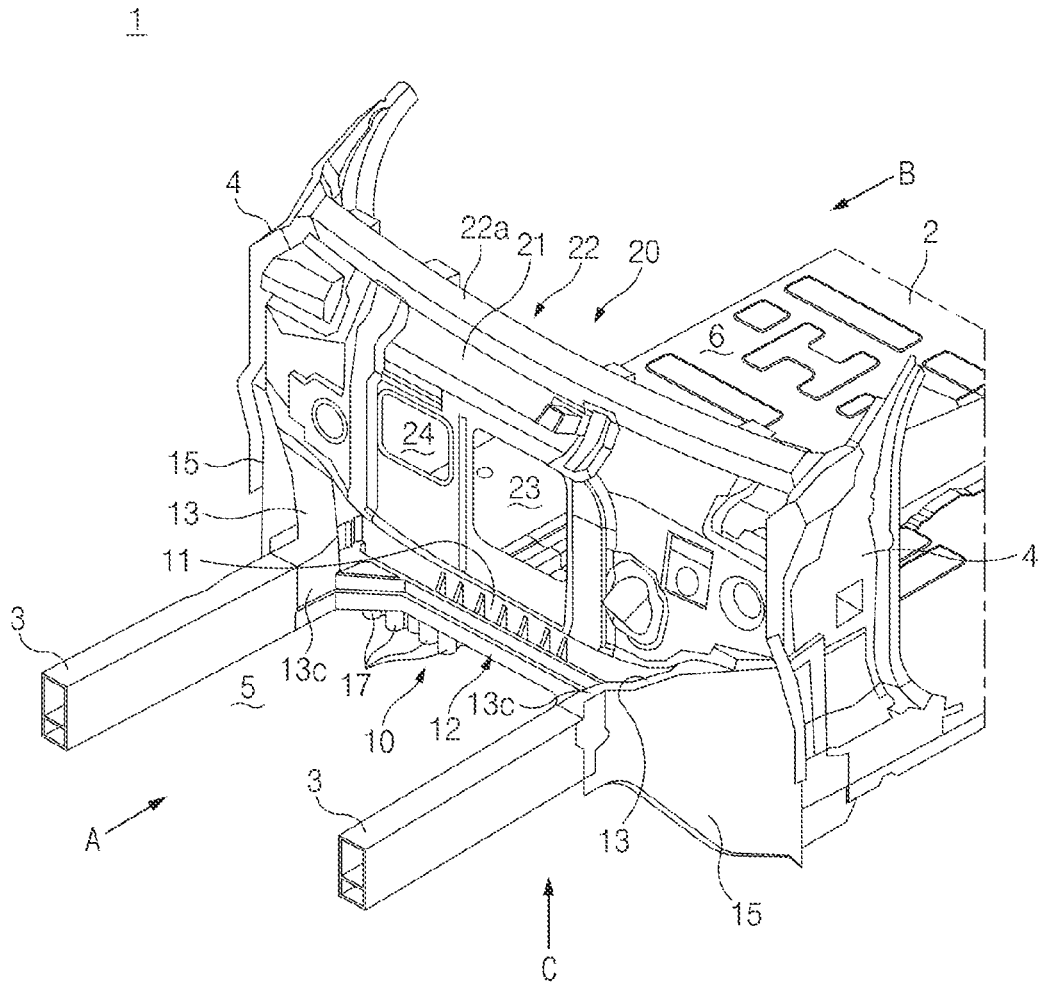
FIG. 1 illustrates a perspective view of a front structure of a vehicle body according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with embodiments of the present disclosure will be omitted in order not to unnecessarily obscure the gist of embodiments of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art and are not to be interpreted as having ideal or excessively formal meanings unless clearly defined as having such in the present application.

Figure 2:
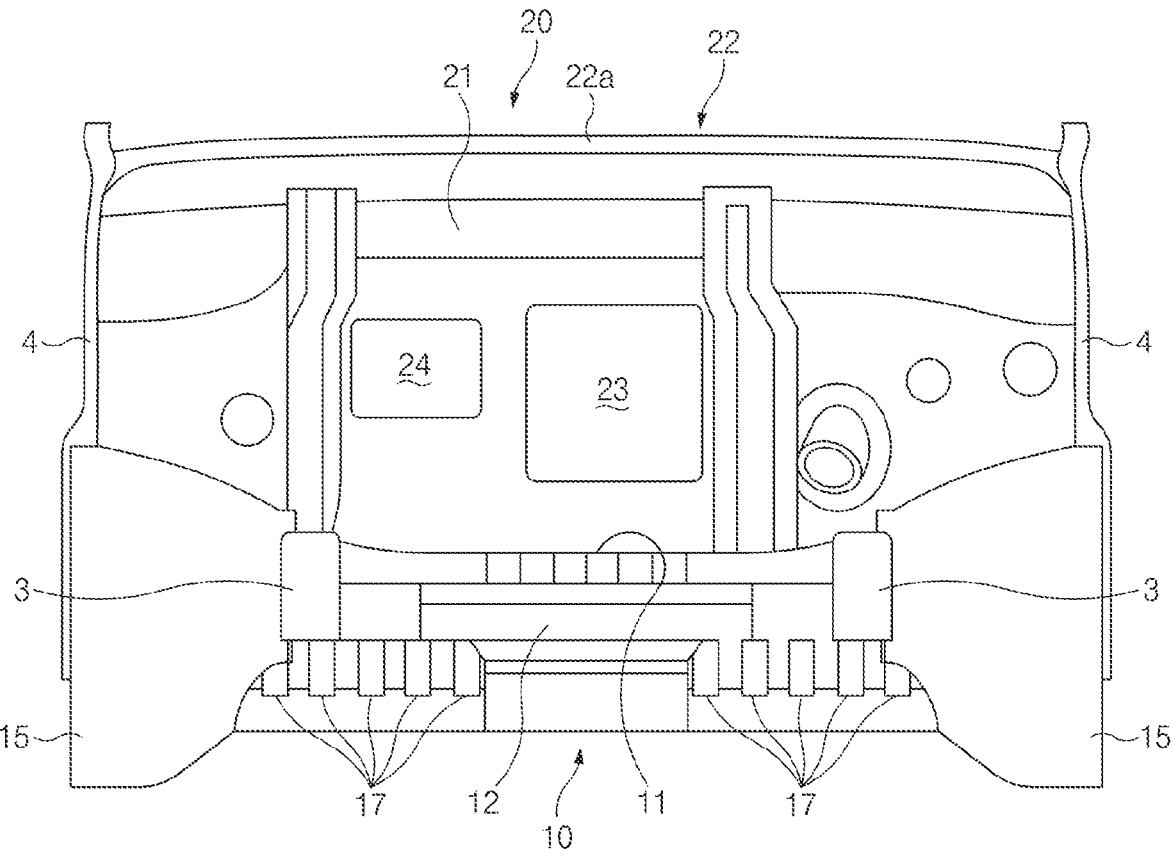
FIG. 2 illustrates a front view, viewed in a direction indicated by arrow A of FIG. 1.
Figure 3:
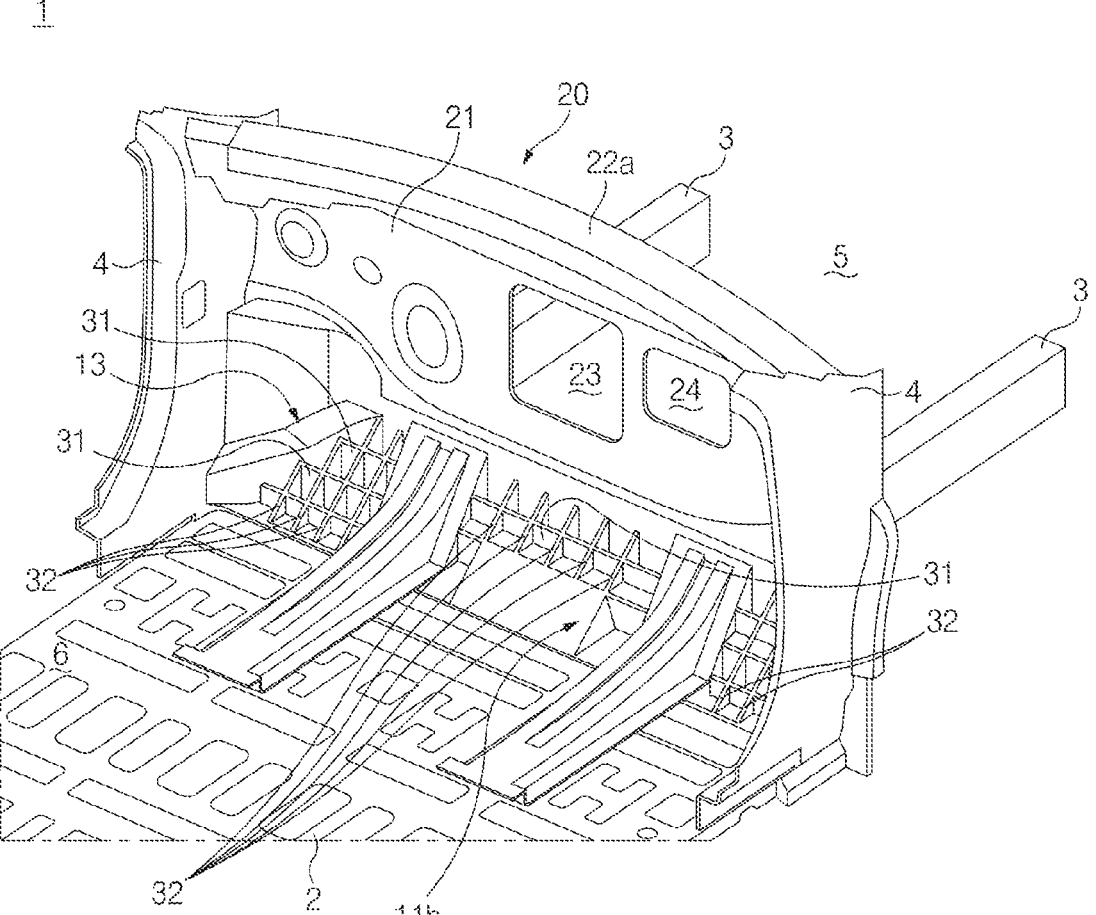
FIG. 3 illustrates a perspective view, viewed in a direction indicated by arrow B of FIG. 1.

Referring to FIGS. 1 to 3, a vehicle body 1 may include a floor panel 2, a dash crossmember 10 mounted on a front edge of the floor panel 2, and a dash panel 20 connected to a top edge of the dash crossmember 10.

The floor panel 2 may form a floor of a passenger compartment 6, and a battery may be disposed under the floor panel 2.

Referring to FIGS. 1 and 3, the dash crossmember 10 may be fixed to the front edge of the floor panel 2 using fasteners, welding, and/or the like. The dash crossmember 10 may extend along a width direction of the vehicle body 1.

A pair of front side members 3 may extend from the dash crossmember 10 toward the front of the vehicle body 1. A pair of front pillars 4 may be mounted on both sides of the dash crossmember 10 and both sides of the dash panel 20, respectively. Each front pillar 4 may be fixed to the corresponding side of the dash crossmember 10 and the corresponding side of the dash panel 20 using fasteners, welding, and/or the like.

Figure 6:
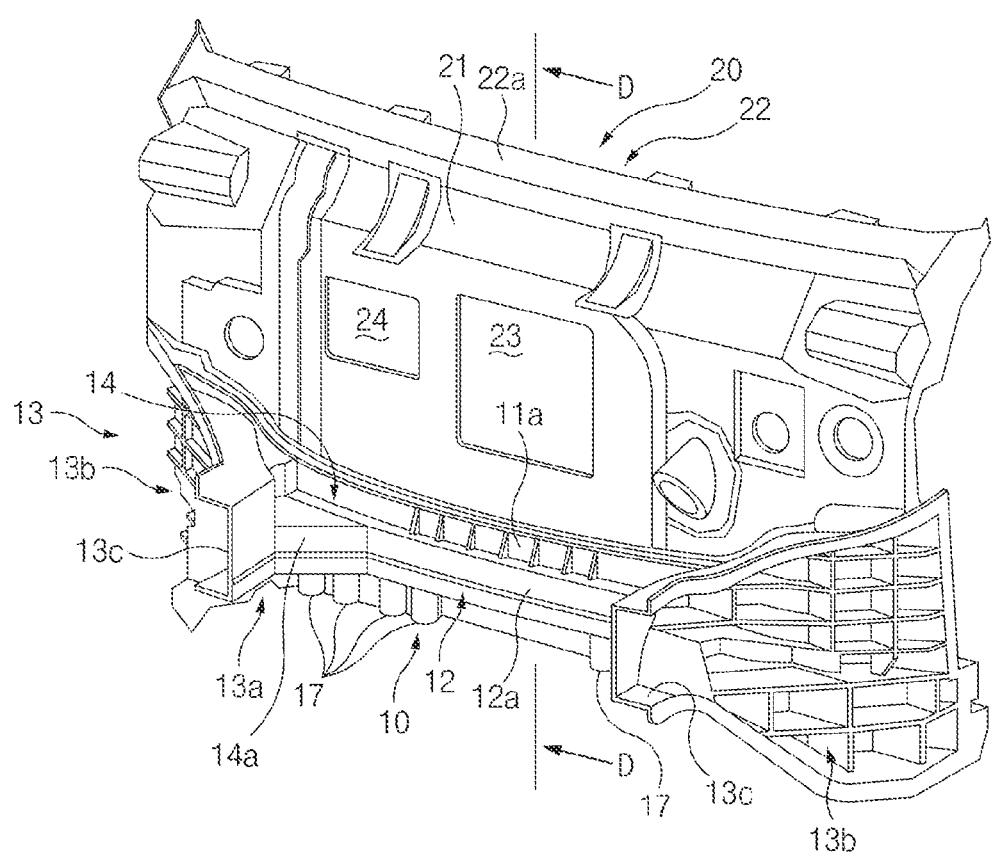
FIG. 6 illustrates a perspective view of a dash crossmember and a dash panel according to an exemplary embodiment of the present disclosure.

Referring to FIG. 6, the dash crossmember 10 may include a cross portion 11 extending in the width direction of the vehicle body 1, a front portion 12 protruding from the cross portion 11 toward the front of the vehicle body 1, and a pair of outrigger portions 13 provided at both ends of the cross portion 11. The dash crossmember 10 may be manufactured by a casing method such as high-vacuum die casting so that the cross portion 11, the front portion 12, and the outrigger portions 13 may form a unitary one-piece structure.

Figure 7:
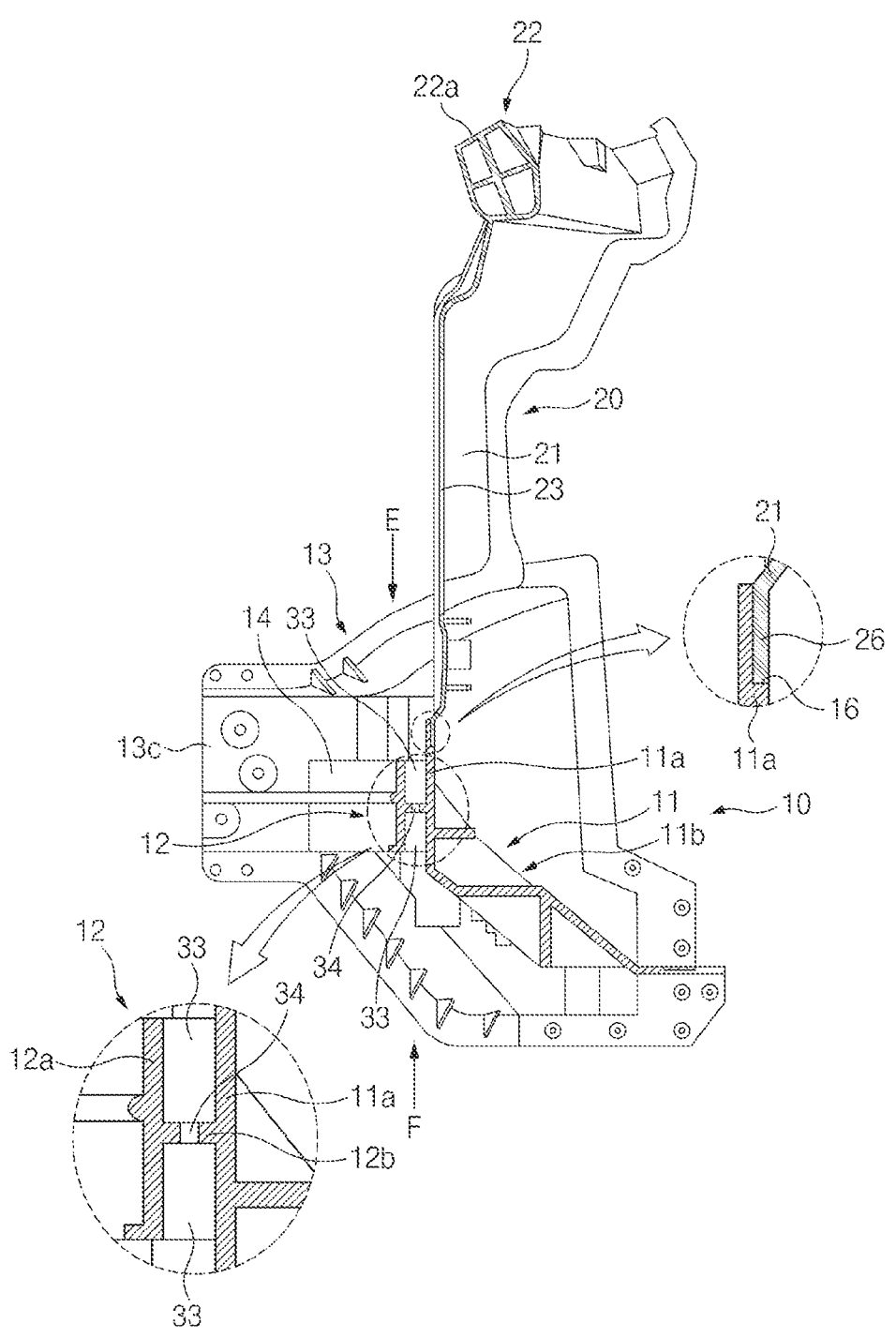
FIG. 7 illustrates a cross-sectional view, taken along line D-D of FIG. 6.

Referring to FIG. 7, the cross portion 11 may include a vertical wall 11a and a reinforcement 11b integrally connected to the vertical wall 11a. The vertical wall 11a and the reinforcement 11b may extend in the width direction of the vehicle body 1.

Referring to FIG. 7, the vertical wall 11a may extend vertically, and a mounting recess 16 may be formed on a top edge of the vertical wall 11a. A bottom edge 26 of the dash panel 20 may be received in the mounting recess 16 of the vertical wall 11a, and the bottom edge 26 of the dash panel 20 may be fixed to the mounting recess 16 of the vertical wall 11a using fasteners, welding, and/or the like.

Referring to FIG. 3, the reinforcement 11b may include a plurality of ribs 31 and 32 intersecting with each other. The plurality of ribs 31 and 32 may include a plurality of first ribs 31 extending in the width direction of the vehicle body 1 and a plurality of second ribs 32 extending in a longitudinal direction of the vehicle body 1.

Figure 4:
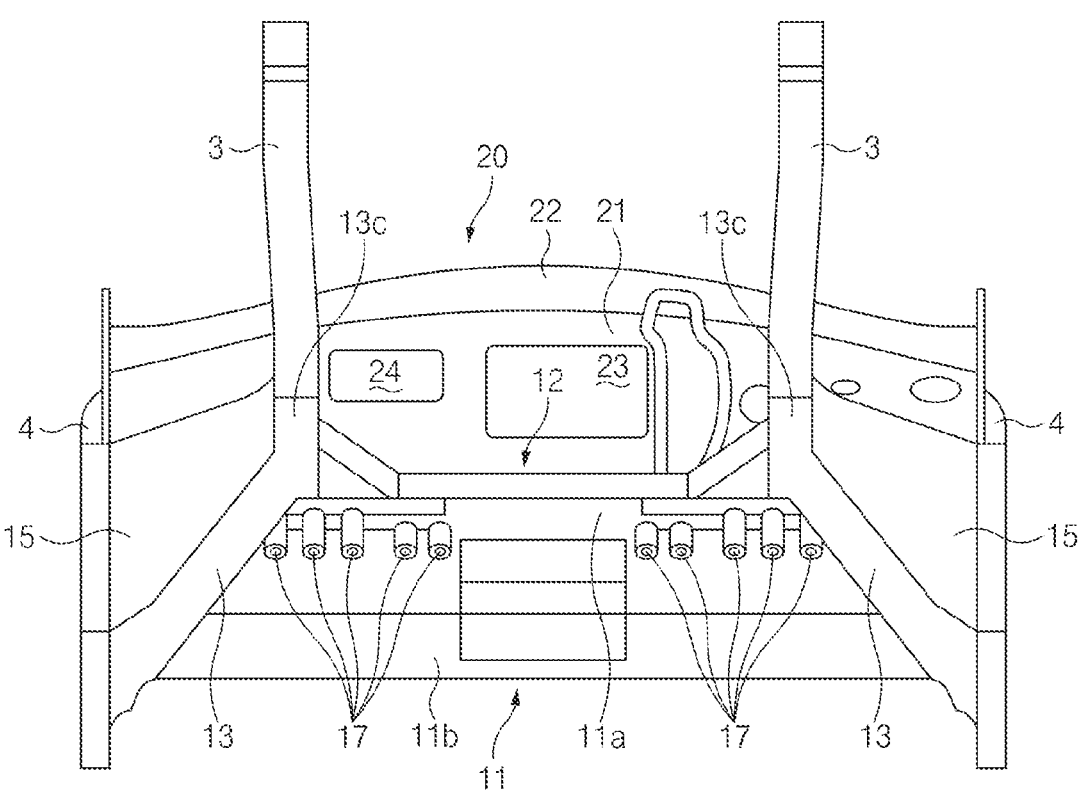
FIG. 4 illustrates a bottom view, viewed in a direction indicated by arrow C of FIG. 1.

Referring to FIGS. 2, 4, and 7, the cross portion 11 may include a plurality of mounting bosses 17 on which a rear portion of a front subframe 8 is mounted, and the plurality of mounting bosses 17 may be integrally formed on a bottom surface of the reinforcement 11b of the cross portion 11. The cross portion 11, the front portion 12, the outrigger portions 13, and the plurality of mounting bosses 17 may form a unitary one-piece structure.

Figure 5:
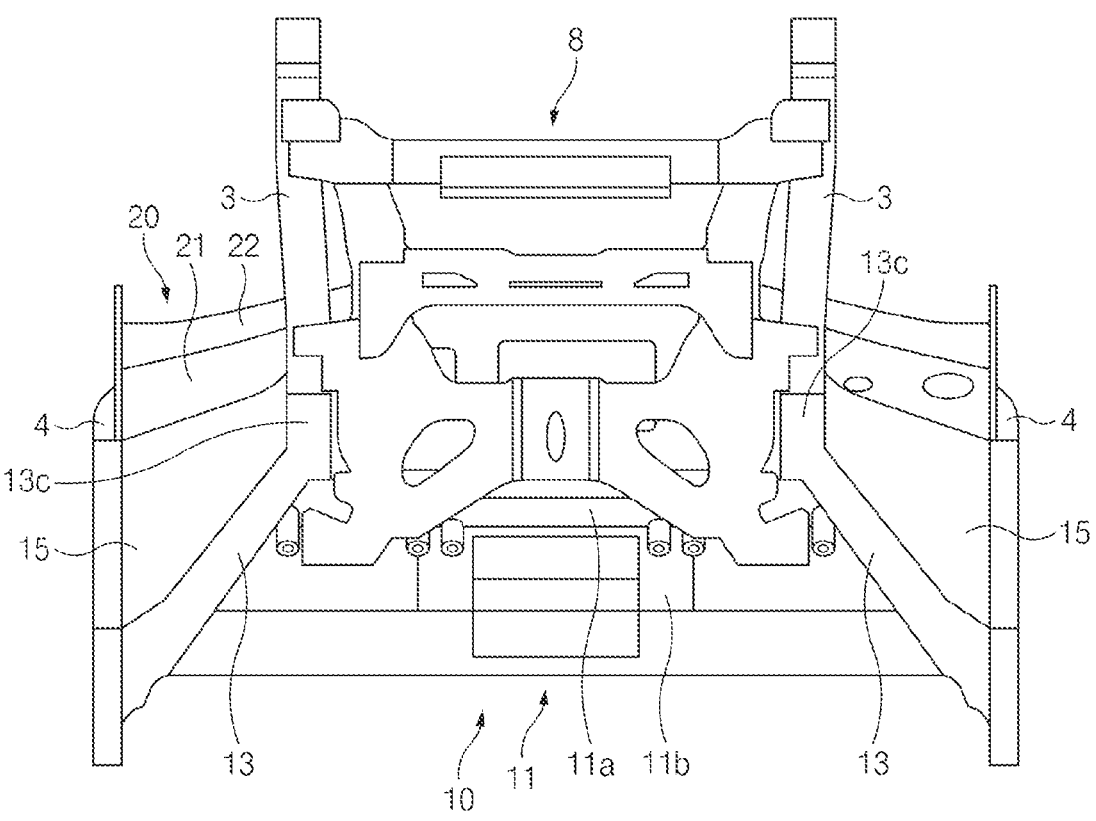
FIG. 5 illustrates a state in which a front subframe is mounted on the front structure of the vehicle body illustrated in FIG. 4.

The front subframe 8 may support a powertrain component, a suspension, and the like. Referring to FIG. 5, a rear mount of the front subframe 8 may be mounted on the plurality of mounting bosses 17.

The front portion 12 may protrude from the cross portion 11 toward the front of the vehicle by a predetermined length so that the front portion 12 may absorb impact energy in the event of a front impact/collision of the vehicle. Referring to FIG. 7, the front portion 12 may include a vertical wall 12a spaced apart from the vertical wall 11a of the cross portion 11 toward the front of the vehicle body 1 and a horizontal wall 12b connecting the vertical wall 12a of the front portion 12 and the vertical wall 11a of the cross portion 11.

The vertical wall 12a of the front portion 12 may extend along a longitudinal direction of the cross portion 11. The vertical wall 12a of the front portion 12 may be parallel to the vertical wall 11a of the cross portion 11, and the vertical wall 12a of the front portion 12 may be located in front of the vertical wall 11a of the cross portion 11.

The horizontal wall 12b of the front portion 12 may protrude horizontally from the vertical wall 11a of the cross portion 11 toward the front of the vehicle body 1. As the horizontal wall 12b is located in the middle of the vertical wall 12a, the vertical wall 12a of the front portion 12, the horizontal wall 12b of the front portion 12, and the vertical wall 11a of the cross portion 11 may form an asymmetrical H-shaped cross section. Accordingly, the vertical wall 12a of the front portion 12, the horizontal wall 12b of the front portion 12, and the vertical wall 11a of the cross portion 11 may define cavities.

Figure 8:
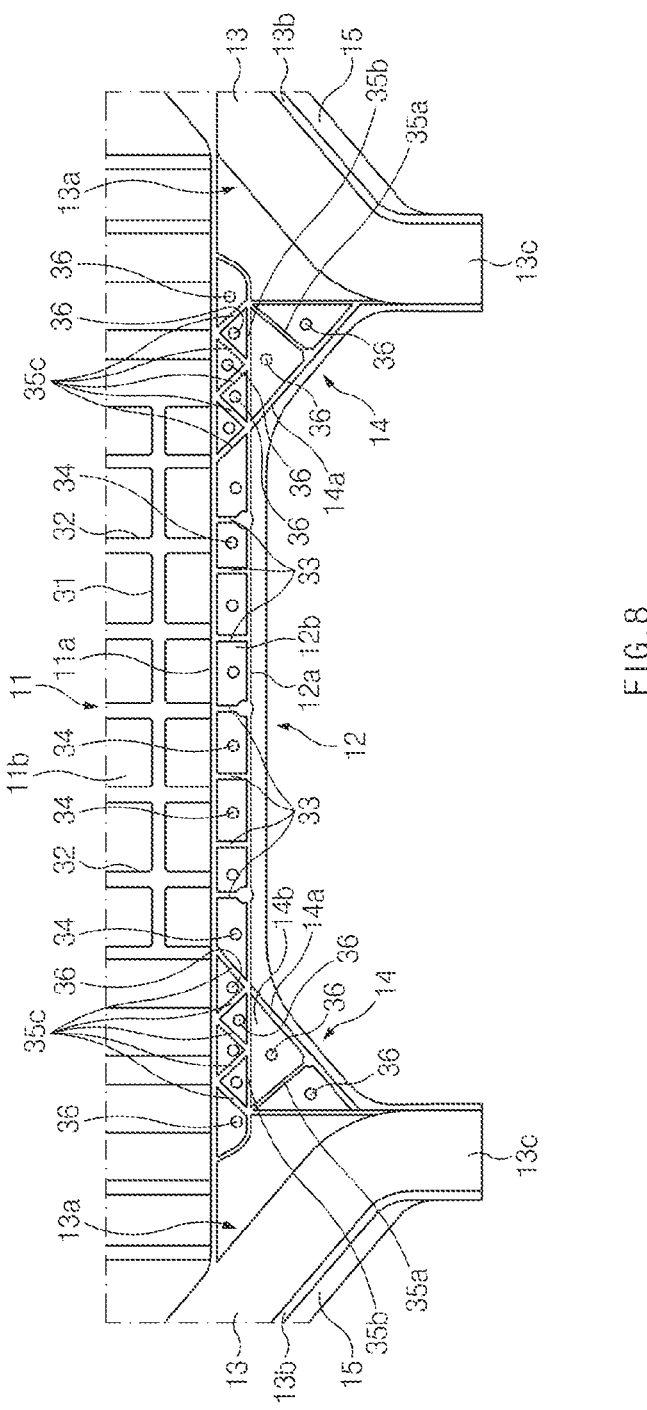
FIG. 8 illustrates a plan view of the dash crossmember, viewed in a direction indicated by arrow E of FIG. 7.

Referring to FIG. 8, the front portion 12 may further include a plurality of reinforcing ribs 33 provided between the vertical wall 12a of the front portion 12 and the vertical wall 11a of the cross portion 11. Stiffness of the front portion 12 may be increased by the plurality of reinforcing ribs 33.

Each reinforcing rib 33 may connect the vertical wall 12a of the front portion 12 and the vertical wall 11a of the cross portion 11. Each reinforcing rib 33 may be connected to and intersect with the horizontal wall 12b. According to an exemplary embodiment, each reinforcing rib 33 may extend along a longitudinal axis of the vehicle body 1, and accordingly the reinforcing rib 33 may be perpendicular to the vertical wall 12a.

The plurality of reinforcing ribs 33 may be spaced apart from each other in the width direction of the vehicle body 1, and the front portion 12 may have a plurality of cavities defined by the plurality of reinforcing ribs 33, the vertical wall 12a of the front portion 12, and the vertical wall 11a of the cross portion 11.

The dash crossmember 10 according to an exemplary embodiment of the present disclosure may have a plurality of through holes 34 formed in the horizontal wall 12b, and each through hole 34 may extend vertically in the horizontal wall 12b in a manner that corresponds to each cavity. A liquid received in the cavities of the front portion 12 may flow downward while passing through the through holes 34 of the horizontal wall 12b so that the liquid may be prevented from being stagnated in the cavities of the front portion 12. Specifically, the liquid such as water and an electrodeposition solution or electroplating solution used for painting a vehicle body may be discharged from the through holes 34 of the horizontal wall 12b so that the liquid may be prevented from being stagnated in the cavities of the front portion 12.

The pair of outrigger portions 13 may be integrally provided on both ends of the cross portion 11, and rear end portions of the pair of front side members 3 may be connected to the pair of outrigger portions 13, respectively. A gap between front ends of the pair of outrigger portions 13 may be less than a gap between rear ends of the pair of outrigger portions 13.

Referring to FIG. 6, each outrigger portion 13 may include an inboard portion 13a facing the interior of the vehicle body 1, an outboard portion 13b facing the exterior of the vehicle body 1, and a front connection portion 13c provided on a front portion thereof. The inboard portion 13a may be closed toward the interior of the vehicle body 1, and the inboard portion 13a may be connected to the corresponding end of the cross portion 11 and the corresponding end of the front portion 12. The outboard portion 13b may be open to the exterior of the vehicle body 1. The outrigger portion 13 may have a plurality of ribs formed therein, and stiffness of the outrigger portion 13 may be increased by the plurality of ribs. Each front side member 3 may be connected to the corresponding front connection portion 13c. The front connection portion 13c may have a space receiving the rear end portion of the front side member 3, and the rear end portion of the front side member 3 may be received in the receiving space of the front connection portion 13c. The rear end portion of the front side member 3 may be fixed to the front connection portion 13c using fasteners, welding, and/or the like.

Referring to FIGS. 1, 2, 4, and 5, the dash crossmember 10 may further include a pair of outer plates 15 fixed to the pair of outrigger portions 13, respectively. Each outer plate 15 may be fixed to the outboard portion 13b of the corresponding outrigger portion 13 so that the outboard portion 13b of the outrigger portion 13 may be closed and stiffness of the outrigger portion 13 may be increased.

Figure 9:
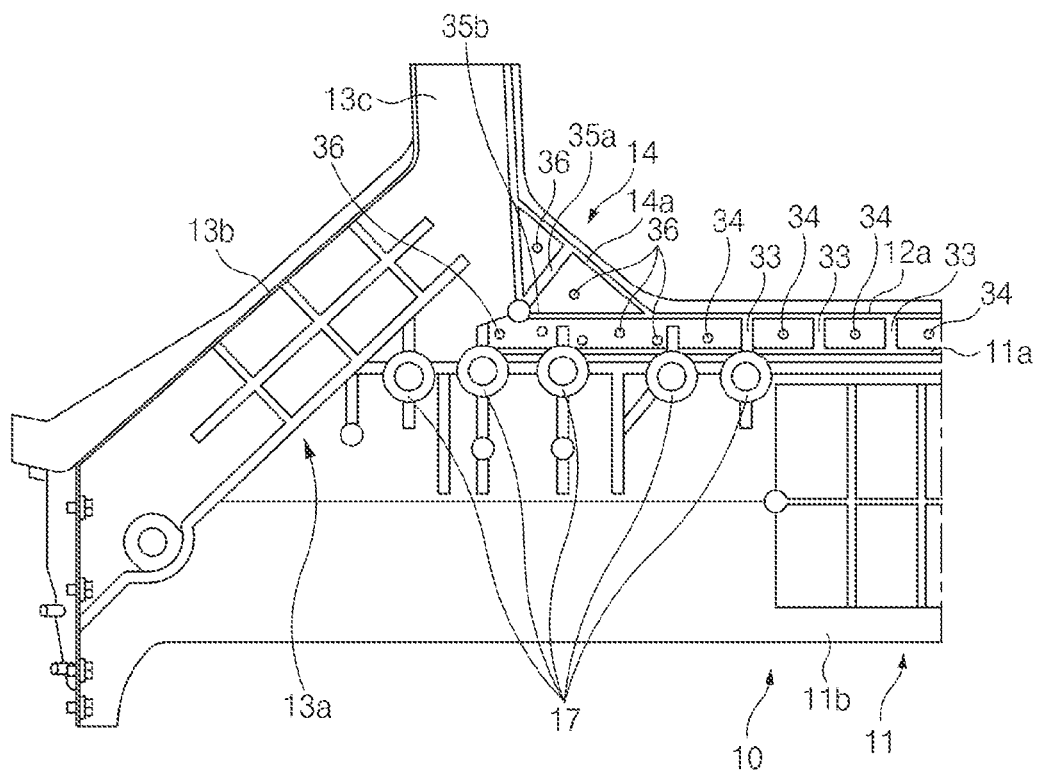
FIG. 9 illustrates a bottom view of a left portion of the dash crossmember, viewed in a direction indicated by arrow F of FIG. 7.
Figure 10:
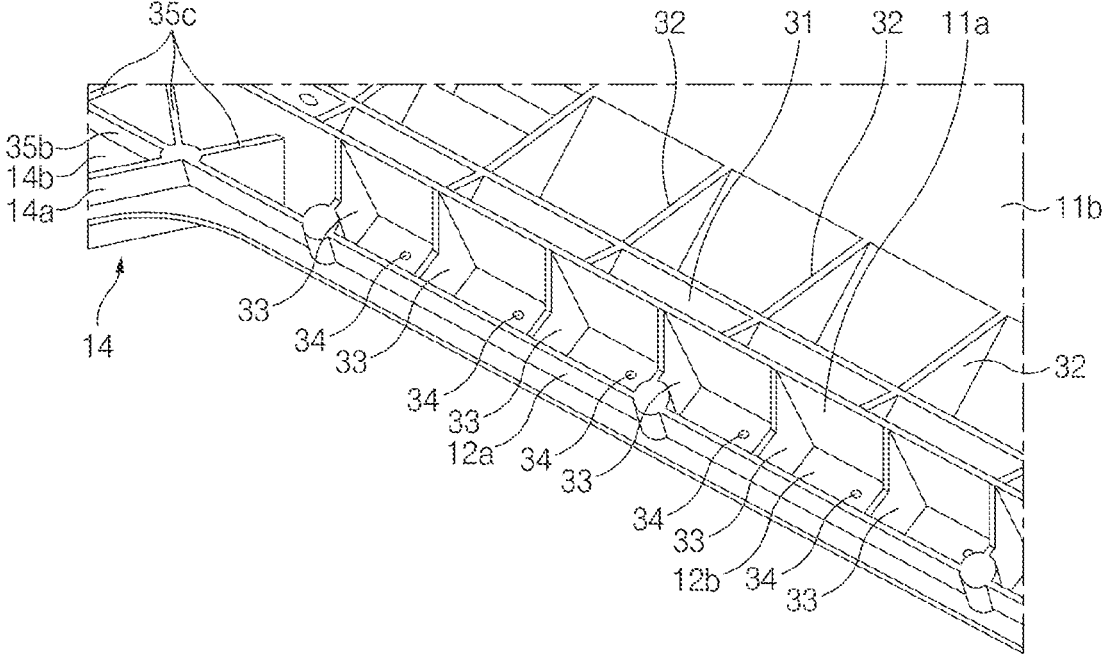
FIG. 10 illustrates a perspective view of a cross portion and a front portion of a dash crossmember according to an exemplary embodiment of the present disclosure.
Figure 11:
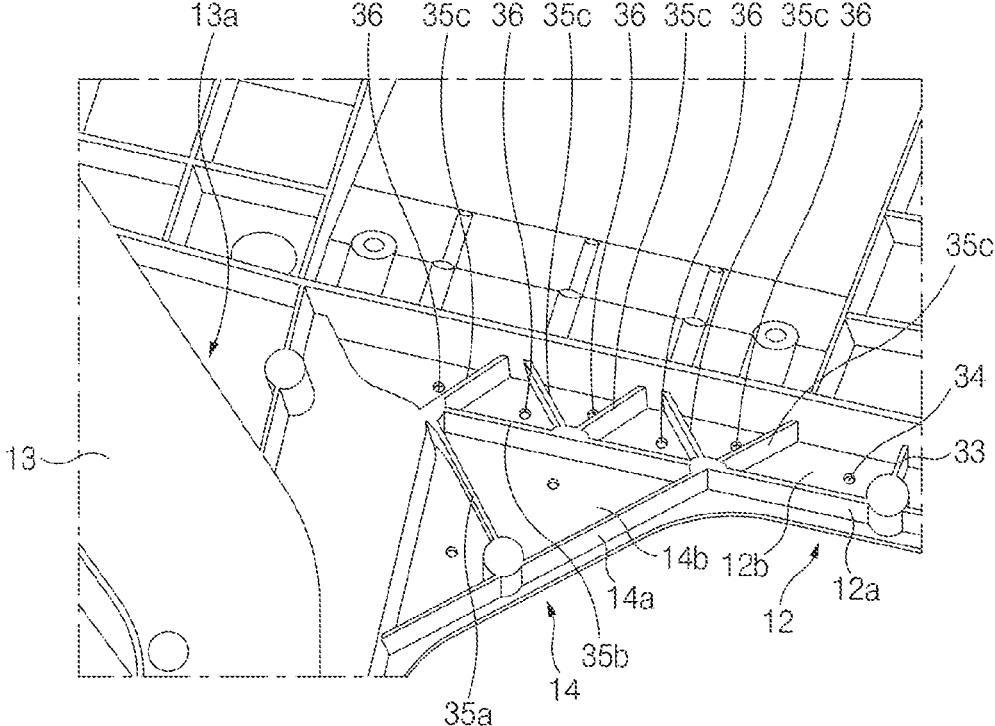
FIG. 11 illustrates a perspective view of an enlarged portion and a front portion of a dash crossmember according to an exemplary embodiment of the present disclosure.

Referring to FIGS. 8 and 9, the dash crossmember 10 may further include a pair of enlarged portions 14 provided at both ends of the front portion 12, and a width of each enlarged portion 14 may gradually increase from each end of the front portion 12 toward the inboard portion 13a of the corresponding outrigger portion 13. The cross portion 11, the front portion 12, the pair of outrigger portions 13, and the pair of enlarged portions 14 may form a unitary one-piece structure. As the cross portion 11, the front portion 12, the pair of outrigger portions 13, and the pair of enlarged portions 14 form a unitary one-piece structure, the number of parts/components of the dash crossmember 10 may be reduced and joint portions of the dash crossmember 10 may be minimized, and accordingly the manufacturing cost of the dash crossmember may be significantly reduced. In addition, since the dash crossmember 10 has no joint portions made by fasteners, welding, and/or the like, not only stiffness of a load path but also strength and stiffness of the dash crossmember 10 may be increased. During an impact/collision of the vehicle, deformation of the dash crossmember 10 may be minimized and damage to the battery may be prevented.

Each enlarged portion 14 may include a side extension wall 14a extending obliquely from each end of the front portion 12 toward the front connection portion 13c of the corresponding outrigger portion 13 and a horizontal wall 14b connecting the side extension wall 14a of the enlarged portion 14 and the vertical wall 11a of the cross portion 11. Each side extension wall 14a may be inclined with respect to the longitudinal axis of the vehicle body 1 at a predetermined angle. Each enlarged portion 14 may integrally connect the corresponding end of the front portion 12 and the corresponding outrigger portion 13, thereby minimizing deformation between the front portion 12 and the pair of outrigger portions 13 in the event of a small-offset crash of the vehicle.

Each enlarged portion 14 may further include a plurality of reinforcing ribs 35a, 35b, and 35c provided between the side extension wall 14a and the vertical wall 11a of the cross portion 11. The plurality of reinforcing ribs 35a, 35b, and 35c may include a first reinforcing rib 35a directly connected to the side extension wall 14a, a second reinforcing rib 35b directly connected to the vertical wall 12a of the front portion 12, and a plurality of third reinforcing ribs 35c provided between the second reinforcing rib 35b and the vertical wall 11a of the cross portion 11. The first reinforcing rib 35a may extend obliquely to intersect with the side extension wall 14a at a predetermined angle. The second reinforcing rib 35b may extend along the width direction of the vehicle body 1, and the second reinforcing rib 35b may extend straightly from the vertical wall 12a of the front portion 12 toward the corresponding outrigger portion 13. The plurality of third reinforcing ribs 35c may be arranged in a zigzag shape between the second reinforcing rib 35b and the vertical wall 11a of the cross portion 11, and each third reinforcing rib 35c may be inclined with respect to the longitudinal axis of the vehicle body 1 at a predetermined angle. Each enlarged portion 14 may have a plurality of cavities defined by the side extension wall 14a, the vertical wall 11a of the cross portion 11, and the plurality of reinforcing ribs 35a, 35b, and 35c.

According to an exemplary embodiment of the present disclosure, the dash crossmember 10 may have a plurality of through holes 36 formed in the horizontal wall 14b of the enlarged portion 14, and each through hole 36 may extend vertically in the horizontal wall 14b in a manner that corresponds to each cavity. A liquid received in the cavities of each enlarged portion 14 may flow downward while passing through the through holes 36 of the horizontal wall 14b so that the liquid may be prevented from being stagnated in the cavities of the enlarged portion 14. Specifically, the liquid such as water and an electrodeposition solution or electroplating solution used for painting a vehicle body may be discharged from the through holes 36 of the horizontal wall 14b so that the liquid may be prevented from being stagnated in the cavities of the enlarged portion 14.

The dash panel 20 may be fixed to the top edge of the dash crossmember 10 by mechanical, thermal, and chemical joining methods. Referring to FIGS. 1 to 3, the dash panel 20 may include a panel portion 21 and a windshield matching portion 22 integrally formed on a top edge of the panel portion 21. The panel portion 21 may have a plurality of mounting openings 23 and 24 in which HVAC components of an HVAC module are mounted. The windshield matching portion 22 may have a matching surface 22a which matches a bottom end of the windshield, and the matching surface 22a may be inclined at an angle corresponding to an angle of inclination of the windshield. The windshield matching portion 22 may be located below a windshield wiper. For example, the dash panel 20 may include at least one material of metal and resin. The dash panel 20 may be manufactured by pressing, casting, and/or the like.

The dash crossmember 10 may be mounted on the front edge of the floor panel 2, and the dash panel 20 may be connected to the top edge of the dash crossmember 10 so that the dash crossmember 10 and the dash panel 20 may be configured to divide the front compartment 5 from the passenger compartment 6. A powertrain system including a prime mover may be disposed in the front compartment 5. For example, a mechanical powertrain system including an internal combustion engine and a transmission in an internal combustion engine vehicle may be disposed in the front compartment 5, and an electric powertrain system including an electric motor, an inverter, and a transmission in an electric vehicle may be disposed in the front compartment 5.

The liquid such as rainwater, a wiper fluid, and an electrodeposition solution or electroplating solution used for painting a vehicle body may flow downward from the windshield matching portion 22 into the cavities of the dash crossmember 10 along the panel portion 21 and the vertical wall 11a of the cross portion 11. The liquid may flow downward while passing through the through holes 34 and 36 of the dash crossmember 10 so that the liquid may be prevented from being stagnated in the cavities of the dash crossmember 10.

As set forth above, the vehicle dash crossmember according to exemplary embodiments of the present disclosure may be designed to have an open cross-section and include the front portion protruding from the cross portion toward the front of the vehicle and the plurality of ribs provided between the cross portion and the front portion so that it may be easily manufactured by a casting method such as high-vacuum die casting, thereby relatively reducing the manufacturing cost thereof. The front portion capable of absorbing impact energy in the event of an impact/collision of the vehicle may protrude from the cross portion toward the front of the vehicle, and the plurality of ribs may be provided to support the open cross-section of the dash crossmember, thereby achieving desired stiffness which is higher than or equal to that of a closed cross-section of a dash crossmember according to the related art.

The dash crossmember according to the related art may have the closed cross-section made by pressing and joining the plurality of parts/components, thereby meeting its target stiffness. However, the manufacturing process thereof may be complex and the manufacturing cost may relatively increase. In particular, the plurality of parts/components in the related art dash crossmember may be joined using fasteners, welding, and/or the like so that joint stiffness between the plurality of parts/components may be relatively reduced and crashworthiness of the dash crossmember may be lowered. On the other hand, the dash crossmember according to exemplary embodiments of the present disclosure may have the open cross-section and the plurality of ribs formed by a casting method such as high-vacuum die casting so that the manufacturing thereof may be facilitated and the manufacturing cost thereof may be relatively reduced. In particular, as the dash crossmember is manufactured by the casting method, the plurality of parts/components (the cross portion, the front portion, the outrigger portions, and the mounting bosses) may form a unitary one-piece structure so that the dash crossmember may achieve its desired target stiffness.

Hereinabove, although embodiments of the present disclosure have been described with reference to exemplary embodiments and the accompanying drawings, embodiments of the present disclosure are not limited thereto, but may be variously modified and altered by those skilled in the art to which the present disclosure pertains without departing from the spirit and scope of the present disclosure claimed in the following claims.

What is claimed is:

1. A vehicle dash crossmember comprising:
   a cross portion extending in a width direction of a vehicle body;
   a front portion protruding from the cross portion toward a front of the vehicle body, wherein the front portion comprises a plurality of through holes; and
   a pair of outrigger portions provided at both ends of the cross portion, respectively, wherein each pair of outrigger portions includes an inboard portion facing an interior of the vehicle body, an outboard portion facing an exterior of the vehicle body, a front connection portion having a space receiving a rear end portion of a front side member, and outer plates fixed to the outboard portion so that the outboard portion is closed.

2. The vehicle dash crossmember according to claim 1, wherein the front portion comprises:
   a first vertical wall spaced apart from the cross portion toward the front of the vehicle body; and
   a horizontal wall connecting the first vertical wall and the cross portion, wherein the plurality of through holes are provided in the horizontal wall.

3. The vehicle dash crossmember according to claim 2, wherein:
   the cross portion comprises a second vertical wall extending in the width direction of the vehicle body; and the front portion further comprises a plurality of reinforcing ribs provided between the first vertical wall of the front portion and the second vertical wall of the cross portion.

4. The vehicle dash crossmember according to claim 1, further comprising a plurality of mounting bosses integrally provided on a bottom surface of the cross portion.

5. A vehicle dash crossmember comprising:

a cross portion extending in a width direction of a vehicle body, the cross portion comprising a vertical wall extending in the width direction of the vehicle body;

a front portion protruding from the cross portion toward a front of the vehicle body, wherein the front portion comprises a plurality of through holes; and a pair of outrigger portions provided at both ends of the cross portion, respectively, wherein each pair of outrigger portions includes an inboard portion facing an interior of the vehicle body, an outboard portion facing an exterior of the vehicle body, a front connection portion having a space receiving a rear end portion of a front side member, and outer plates fixed to the outboard portion so that the outboard portion is closed.

6. The vehicle dash crossmember according to claim 5, wherein a gap between front ends of the pair of outrigger portions is less than a gap between rear ends of the pair of outrigger portions.

7. The vehicle dash crossmember according to claim 5, further comprising a pair of enlarged portions provided at both ends of the front portion, wherein a width of each enlarged portion gradually increases from each end of the front portion toward the inboard portion of a corresponding outrigger portion.

8. The vehicle dash crossmember according to claim 7, wherein each enlarged portion comprises:

a side extension wall extending obliquely from each end of the front portion toward the corresponding outrigger portion; and a horizontal wall connecting the side extension wall and the vertical wall of the cross portion.

9. The vehicle dash crossmember according to claim 8, wherein the horizontal wall of each enlarged portion comprises a plurality of through holes.

10. The vehicle dash crossmember according to claim 8, wherein each enlarged portion further comprises a plurality of reinforcing ribs provided between the side extension wall and the vertical wall of the cross portion.

11. A vehicle body comprising:

a floor panel;

a dash crossmember mounted on a front edge of the floor panel, the dash crossmember comprising:

a cross portion extending in a width direction of the vehicle body;

a front portion protruding from the cross portion toward a front of the vehicle body, the front portion comprising a plurality of through holes;

a pair of outrigger portions provided at both ends of the cross portion, respectively, wherein each pair of outrigger portions includes an inboard portion facing an interior of the vehicle body, an outboard portion facing an exterior of the vehicle body, a front connection portion having a space receiving a rear end portion of a front side member, and outer plates fixed to the outboard portion so that the outboard portion is closed; and a dash panel connected to a top edge of the dash crossmember.

12. The vehicle body according to claim 11, wherein the front portion comprises:

a first vertical wall spaced apart from the cross portion toward the front of the vehicle body; and a horizontal wall connecting the first vertical wall and the cross portion, wherein the plurality of through holes are provided in the horizontal wall.

13. The vehicle body according to claim 12, wherein:

the cross portion comprises a second vertical wall extending in the width direction of the vehicle body; and the front portion further comprises a plurality of reinforcing ribs provided between the first vertical wall of the front portion and the second vertical wall of the cross portion.

14. The vehicle body according to claim 11, wherein:

the dash panel comprises a panel portion and a windshield matching portion integrally provided on a top edge of the panel portion; and the windshield matching portion has a matching surface inclined at a predetermined angle.

15. The vehicle body according to claim 11, further comprising a plurality of mounting bosses integrally provided on a bottom surface of the cross portion.

16. The vehicle body according to claim 11, wherein a gap between front ends of the pair of outrigger portions is less than a gap between rear ends of the pair of outrigger portions.

17. The vehicle body according to claim 11, further comprising a pair of enlarged portions provided at both ends of the front portion, wherein a width of each enlarged portion gradually increases from each end of the front portion toward the inboard portion of a corresponding outrigger portion.

18. The vehicle body according to claim 17, wherein each enlarged portion comprises:

a side extension wall extending obliquely from each end of the front portion toward the corresponding outrigger portion; and a horizontal wall connecting the side extension wall and a vertical wall of the cross portion, the horizontal wall of each enlarged portion comprising a plurality of through holes.

19. The vehicle body according to claim 18, wherein each enlarged portion further comprises a plurality of reinforcing ribs provided between the side extension wall and the vertical wall of the cross portion.

20. The vehicle body according to claim 19, wherein each of the reinforcing ribs extends along a longitudinal axis of the vehicle body.

* * * * *